(12) United States Patent
Yamada et al.

(10) Patent No.: US 9,612,424 B2
(45) Date of Patent: Apr. 4, 2017

(54) IMAGING LENS AND IMAGING APPARATUS

(71) Applicant: FUJIFILM Corporation, Tokyo (JP)

(72) Inventors: Hiroshi Yamada, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 81 days.

(21) Appl. No.: 14/586,179

(22) Filed: Dec. 30, 2014

(65) Prior Publication Data

US 2015/0116848 A1 Apr. 30, 2015

Related U.S. Application Data

(63) Continuation of application No. PCT/JP2013/003926, filed on Jun. 24, 2013.

(30) Foreign Application Priority Data

Jul. 5, 2012 (JP) .................................. 2012-151319

(51) Int. Cl.
*G02B 13/04* (2006.01)
*G02B 15/14* (2006.01)
*G02B 9/64* (2006.01)

(52) U.S. Cl.
CPC ............... *G02B 13/04* (2013.01); *G02B 9/64* (2013.01); *G02B 15/14* (2013.01)

(58) Field of Classification Search
CPC ...................................................... G02B 13/04
USPC ........................................................ 359/749
See application file for complete search history.

(56) References Cited

U.S. PATENT DOCUMENTS

| 5,742,439 A | 4/1998 | Schuster | |
|---|---|---|---|
| 6,894,847 B2 | 5/2005 | Suzuki | |
| 2014/0133038 A1* | 5/2014 | Lee | G02B 13/04 359/708 |

FOREIGN PATENT DOCUMENTS

| JP | 07-5359 | 1/1995 |
|---|---|---|
| JP | 08-94926 | 4/1996 |
| JP | 2000-131606 | 5/2000 |
| JP | 2001-330776 | 11/2001 |
| JP | 2004-219610 | 8/2004 |
| JP | 2005-077548 | 3/2005 |
| JP | 2008-052174 | 3/2008 |

OTHER PUBLICATIONS

International Search Report, PCT/JP2013/003926, Sep. 24, 2013.
(Continued)

*Primary Examiner* — James Jones
(74) *Attorney, Agent, or Firm* — Young & Thompson

(57) ABSTRACT

An imaging lens consists of a first lens group, a second lens group, an aperture stop and a third lens group that has positive refractive power in this order from an object side. The first lens group consists of an L11 lens having positive refractive power, an L12 lens having negative refractive power, an L13 meniscus lens having negative refractive power with its concave surface facing an image side, an L14 lens having negative refractive power with its concave surface facing the object side and two or three lenses, each having positive refractive power, in this order from the object side. The second lens group consists of an L2p lens having positive refractive power and an L2n lens having negative refractive power.

13 Claims, 10 Drawing Sheets

EXAMPLE 1

(56) References Cited

OTHER PUBLICATIONS

German Official Action—11 2013 003 353.4—Jan. 28, 2016.
Chinese Office Action dated Feb. 16, 2016; Application No. 2016020600376470.
Chinese Office Action dated Feb. 16, 2016; Patent Application No. 201380033925.X.

* cited by examiner

FIG.1 <u>EXAMPLE 1</u>
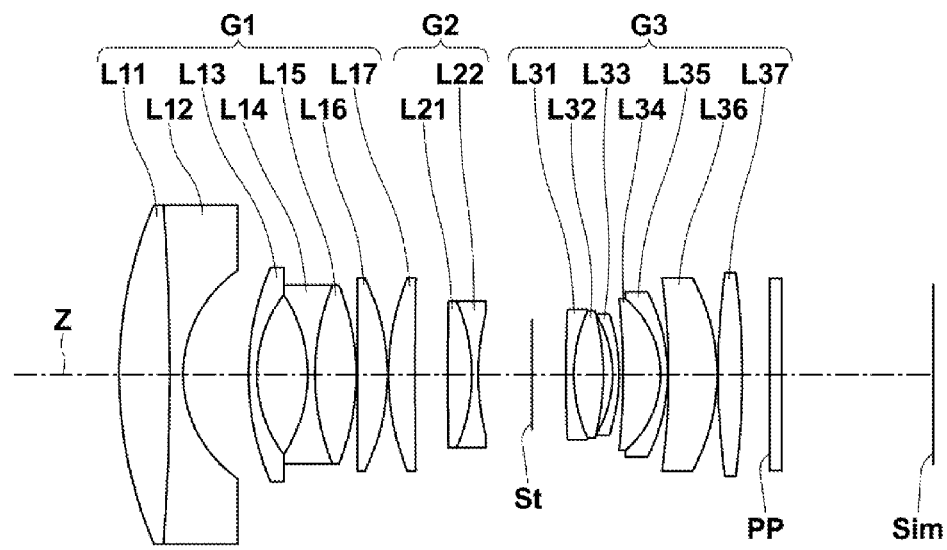
FIG.2 <u>EXAMPLE 2</u>
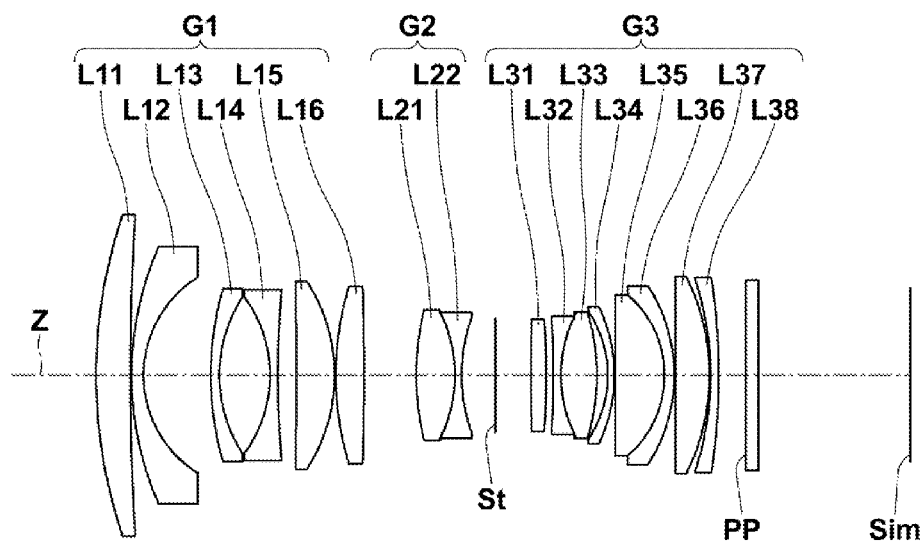

FIG.3  EXAMPLE 3
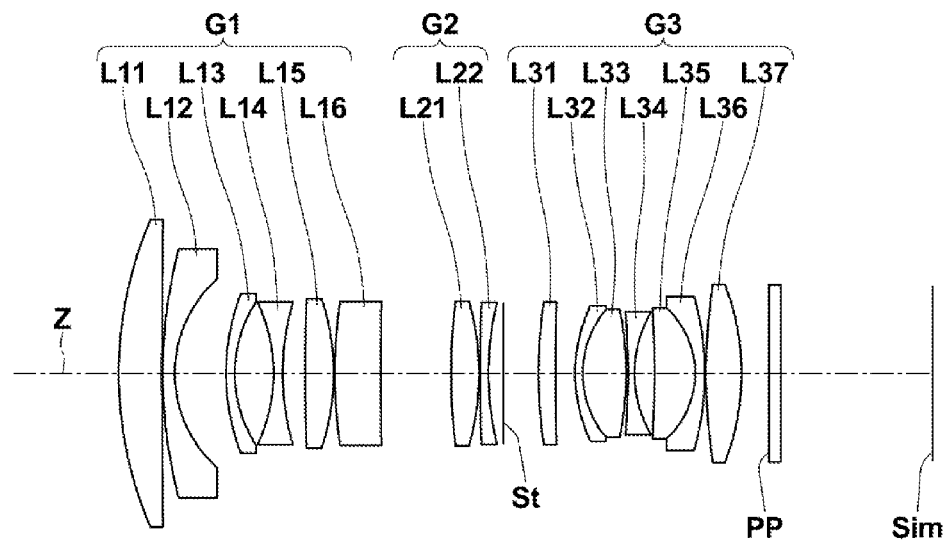
FIG.4  EXAMPLE 4
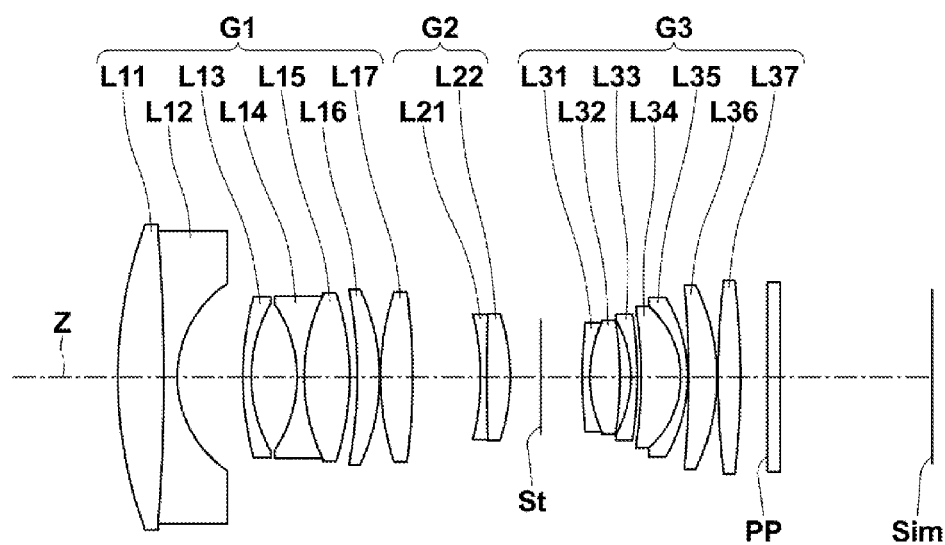

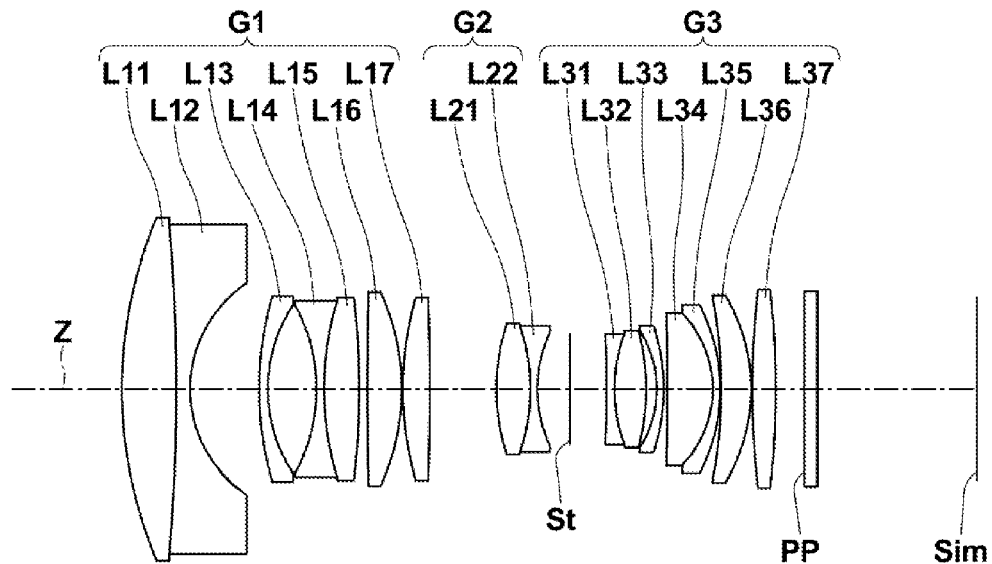
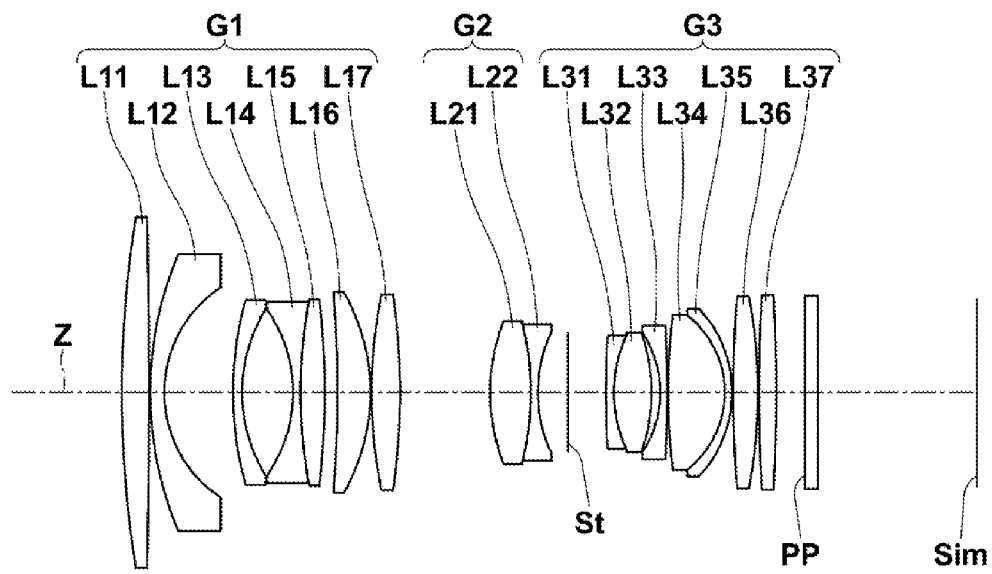

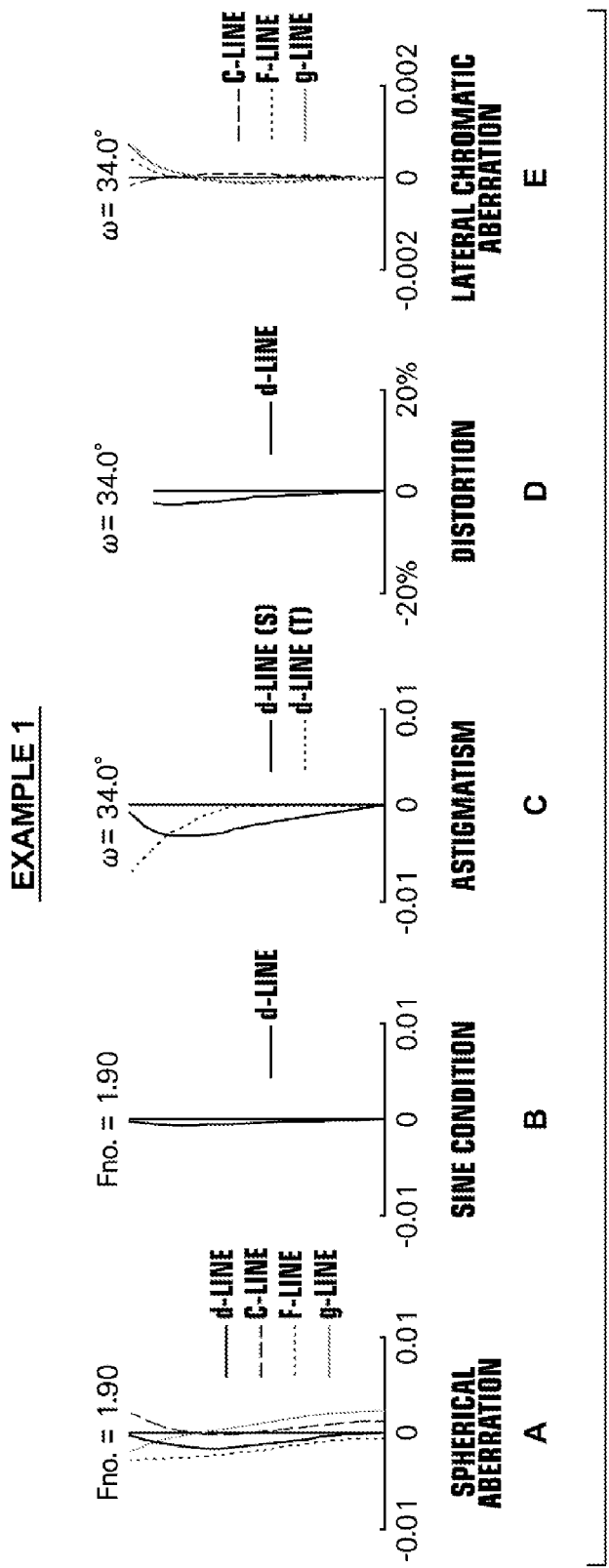

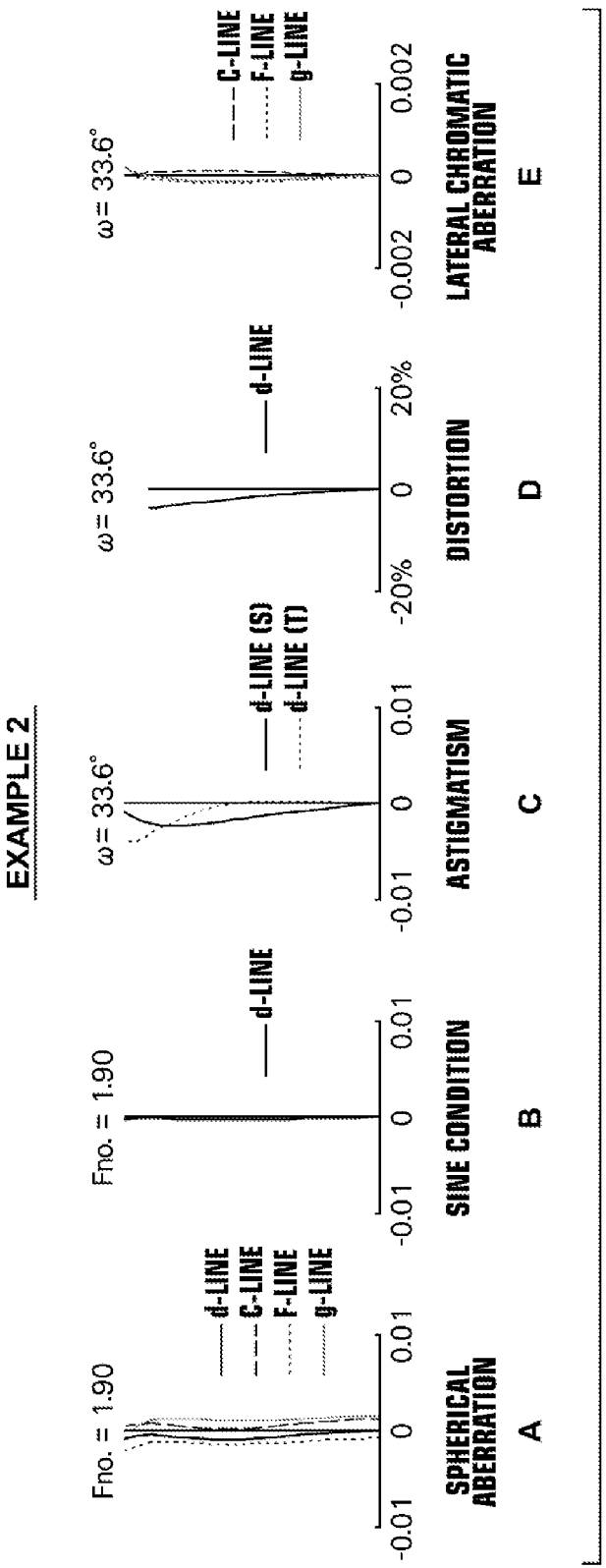

IMAGING LENS AND IMAGING APPARATUS

CROSS-REFERENCE TO RELATED APPLICATIONS

This application is a Continuation of PCT International Application No. PCT/JP2013/003926 filed on Jun. 24, 2013, which claims priority under 35 U.S.C. §119(a) to Japanese Patent Application No. 2012-151319 filed on Jul. 5, 2012. Each of the above applications are hereby expressly incorporated by reference, in its entirety, into the present application.

BACKGROUND OF THE INVENTION

Field of the Invention

The present invention relates to a retrofocus-type imaging lens and an imaging apparatus. In particular, the present invention relates to an imaging lens used in electronic cameras, such as a digital camera, a camera for broadcasting, a camera for surveillance and a camera for film making, and an imaging apparatus including the imaging lens.

Description of the Related Art

As an imaging lens used in an imaging apparatus, such as a video camera and an electronic still camera, which uses an imaging device, such as a CCD (Charge Couple Device) and a CMOS (Complementary Metal Oxide Semiconductor), as a recording medium, various imaging lenses with angles of view exceeding 60 degrees have been proposed, for example, in Japanese Unexamined Patent Publication No. 8(1996)-094926 (Patent Document 1), Japanese Unexamined Patent Publication No. 2000-131606 (Patent Document 2) and Japanese Unexamined Patent Publication No. 2004-219610 (Patent Document 3).

SUMMARY OF THE INVENTION

However, all of the lenses proposed in Patent Documents 1 through 3 have drawbacks that F-numbers are about 2.8 through 3.6, which means slow lenses.

In view of the aforementioned circumstances, it is an object of the present invention to provide a fast imaging lens in which various aberrations are excellently corrected, and the total length of which is short, and also an imaging apparatus including the lens.

An imaging lens of the present invention consists of a first lens group, a second lens group, a stop, and a third lens group that has positive refractive power in this order from an object side. The first lens group consists of an L11 lens having positive refractive power, an L12 lens having negative refractive power, an L13 meniscus lens having negative refractive power with its concave surface facing an image side, an L14 lens having negative refractive power with its concave surface facing the object side and two or three lenses, each having positive refractive power, in this order from the object side. The second lens group consists of two lenses of an L2p lens having positive refractive power and an L2n lens having negative refractive power. The third lens group includes a cemented lens of a lens having positive refractive power and a lens having negative refractive power cemented together, a lens having negative refractive power, and a cemented lens of a lens having positive refractive power and a lens having negative refractive power cemented together consecutively in this order from the object side.

In the imaging lens of the present invention, it is desirable that the following conditional expression is satisfied:

$$20 < vd12 - vd14 \quad (1), \text{where}$$

vd12: an Abbe number of the L12 lens with respect to d-line, and vd14: an Abbe number of the L14 lens with respect to d-line.

It is more desirable that the following conditional expression is satisfied:

$$25 < vd12 - vd14 \quad (1a).$$

Further, it is desirable that the third lens group includes at least three lenses, each having positive refractive power, and at least three lenses, each having negative refractive power.

Further, it is desirable that focusing is performed by moving the third lens group in the direction of an optical axis.

Further, it is desirable that the following conditional expression is satisfied:

$$0.4 < f/f3 < 0.8 \quad (2), \text{where}$$

f3: a focal length of the third lens group.

It is more desirable that the following conditional expression is satisfied:

$$0.5 < f/f3 < 0.7 \quad (2a).$$

Further, it is desirable that the following conditional expression is satisfied:

$$-0.6 < f/f1 < 0.8 \quad (3), \text{where}$$

f1: a focal length of the first lens group.

It is more desirable that the following conditional expression is satisfied:

$$-0.5 < f/f1 < 0.6 \quad (3a).$$

Further, it is desirable that the following conditional expression is satisfied:

$$20 < vd1pave < 45 \quad (4), \text{where}$$

vd1pave: an Abbe number of a most image-side lens in the first lens group when the number of lenses in the first lens group arranged toward the image side of the L14 lens is two, and an average Abbe number of two lenses from the image side among three lenses arranged toward the image side of the L14 lens in the first lens group when the number of lenses in the first lens group arranged toward the image side of the L14 lens is three.

Further, it is more desirable that the following conditional expression is satisfied:

$$25 < vd1pave < 40 \quad (4a).$$

Further, it is desirable that the L11 lens and the L12 lens are cemented together.

An imaging apparatus of the present invention includes the imaging lens of the present invention.

An imaging lens of the present invention consists of a first lens group, a second lens group, a stop, and a third lens group that has positive refractive power in this order from an object side. Further, the first lens group consists of an L11 lens having positive refractive power, an L12 lens having negative refractive power, an L13 meniscus lens having negative refractive power with its concave surface facing an image side, an L14 lens having negative refractive power with its concave surface facing the object side and two or three lenses, each having positive refractive power, in this order from the object side. Further, the second lens group consists of an L2p lens having positive refractive power and an L2n lens having negative refractive power. Therefore, various aberrations are excellently corrected in the imaging lens. Further, the imaging lens is a fast lens the total length of which is short.

The imaging apparatus of the present invention includes the imaging lens of the present invention. Therefore, bright high-quality video images are obtainable. Further, it is possible to reduce the size of the whole apparatus.

BRIEF DESCRIPTION OF THE DRAWINGS

FIG. 1 is a cross section illustrating the lens structure of an imaging lens according to an embodiment of the present invention (also Example 1);

FIG. 2 is a cross section illustrating the lens structure of an imaging lens in Example 2 of the present invention;

FIG. 3 is a cross section illustrating the lens structure of an imaging lens in Example 3 of the present invention;

FIG. 4 is a cross section illustrating the lens structure of an imaging lens in Example 4 of the present invention;

FIG. 5 is a cross section illustrating the lens structure of an imaging lens in Example 5 of the present invention;

FIG. 6 is a cross section illustrating the lens structure of an imaging lens in Example 6 of the present invention;

FIG. 7 is aberration diagrams (Sections A through E) of the imaging lens in Example 1 of the present invention;

FIG. 8 is aberration diagrams (Sections A through E) of the imaging lens in Example 2 of the present invention;

DESCRIPTION OF THE PREFERRED EMBODIMENTS

Figure 9:
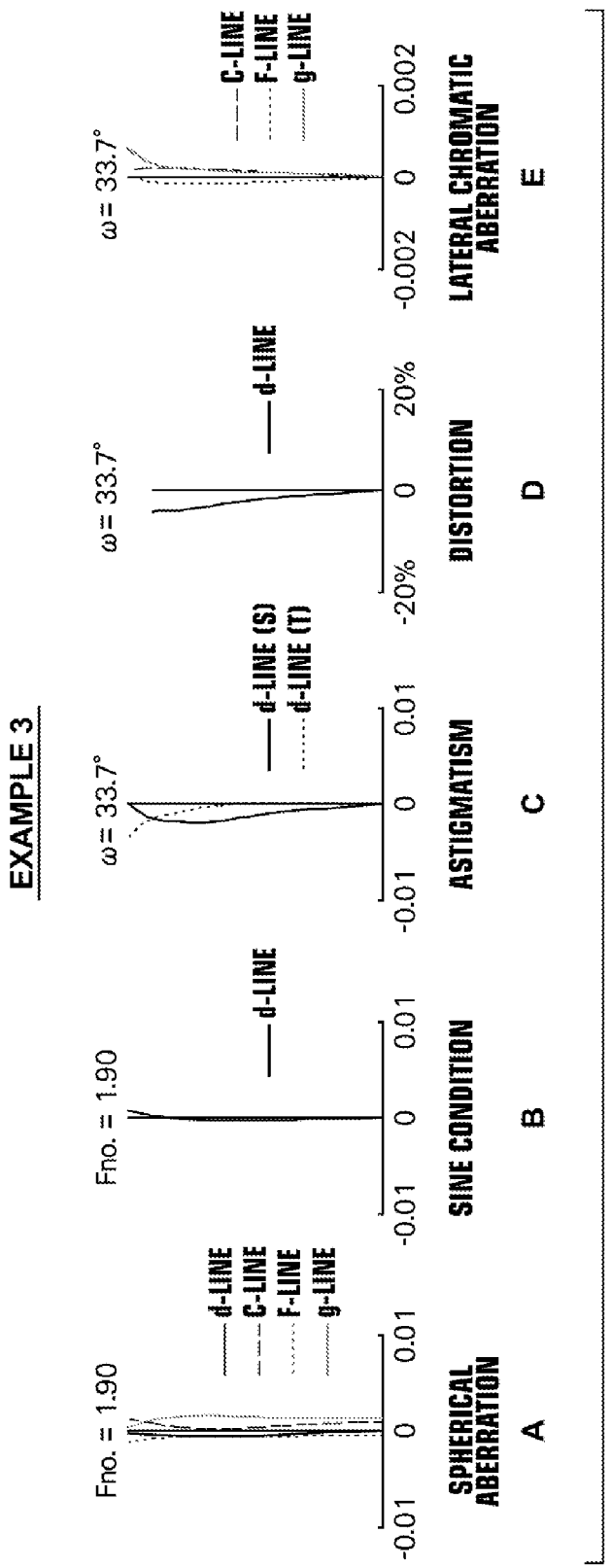
FIG. 9 is aberration diagrams (Sections A through E) of the imaging lens in Example 3 of the present invention.

Hereinafter, embodiments of the present invention will be described in detail with reference to drawings. FIG. 1 is a cross section illustrating the lens structure of an imaging lens according to an embodiment of the present invention (also Example 1). The example of structure illustrated in FIG. 1 is also the structure of an imaging lens in Example 1, which will be described later. In FIG. 1, the left side is an object side, and the right side is an image side.

This imaging lens consists of first lens group G1, second lens group G2, aperture stop St, and third lens group G3 that has positive refractive power, along optical axis Z, in this order from the object side. Here, aperture stop St illustrated in FIG. 1 does not necessarily represent the size nor the shape of aperture stop, but a position on optical axis Z.

When this imaging lens is applied to an imaging apparatus, it is desirable to arrange a cover glass, a prism, and various filters, such as an infrared ray cut filter and a low-pass filter, between an optical system and image plane Sim based on the structure of a camera on which the lens is mounted. Therefore, FIG. 1 illustrates an example in which parallel-flat-plate-shaped optical member PP, which is assumed to be such elements, is arranged between third lens group G3 and image plane Sim.

First lens group G1 consists of L11 lens L11 having positive refractive power, L12 lens L12 having negative refractive power, L13 meniscus lens L13 having negative refractive power with its concave surface facing the image side, L14 lens L14 having negative refractive power with its concave surface facing the object side and three lenses L15, L16 and L17, each having positive refractive power, in this order from the object side.

Second lens group G2 consists of lens L21 (L2p lens) having positive refractive power and lens L22 (L2n lens) having negative refractive power.

When L11 lens L11, which is arranged most toward the object side, has positive refractive power, as described above, that is effective in reducing the total length of the imaging lens, and in correcting a lateral chromatic aberration.

Further, when L12 lens L12, L13 lens L13 and L14 lens L14, which follow L11 lens L11, have negative refractive power, that is effective in widening an angle of view. When the negative refractive power is shared by the three lenses, it is possible to reduce distortion, which tends to be generated in a negative lens arranged close to an object. Further, when L13 lens L13 has a meniscus shape with its concave surface facing the image side, it is possible to further reduce generation of distortion. Further, when L14 lens L14 has a concave surface facing the object side, it is possible to reduce an over-corrected spherical aberration, which tends to be generated in a negative lens, especially a high-order spherical aberration.

Further, when a lens or lenses having positive refractive power are arranged toward the image side of L14 lens L14, that is advantageous to correction of a lateral chromatic aberration generated in L12 lens L12 through L14 lens L14. Further, when two or three positive lenses are arranged toward the image side of L14 lens L14, it is possible to reduce generation of a spherical aberration, compared with a case of arranging only one positive lens.

Further, when second lens group G2 consists of lens L21 (L2p lens) having positive refractive power and lens L22 (L2n lens) having negative refractive power, that is advantageous to correction of a coma aberration.

Further, when aperture stop St is arranged between second lens group G2 and third lens group G3, it is possible to excellently balance the diameter of first lens group G1 and the diameter of third lens group G3. That is advantageous to reduction in the size of the imaging lens.

In the imaging lens according to an embodiment of the present invention, it is desirable that the following conditional expression (1) is satisfied. When conditional expression (1) is satisfied, it is possible to excellently balance a lateral chromatic aberration and a longitudinal chromatic aberration. When the following conditional expression (1a) is satisfied, more excellent characteristics are achievable:

$$20 < vd12 - vd14 \qquad (1); \text{ and}$$

$$25 < vd12 - vd14 \qquad (1a), \text{ where}$$

vd12: an Abbe number of L12 lens L12 with respect to d-line, and vd14: an Abbe number of L14 lens L14 with respect to d-line.

It is desirable that third lens group G3 includes at least three lenses, each having positive refractive power, and at least three lenses, each having negative refractive power. When third lens group G3 is structured to include three or more positive lenses, it is possible to reduce generation of a spherical aberration. Further, when third lens group G3 is structured to include three or more negative lenses, it is possible to prevent generation of an over-corrected high-order spherical aberration. Consequently, it is possible to reduce an F-number.

Further, it is desirable that third lens group G3 includes at least two cemented lenses. When third lens group G3 is structured in such a manner, it is possible to excellently correct a longitudinal chromatic aberration, and to reduce a difference in spherical aberrations according to chromatic aberrations.

It is desirable that focusing is performed by moving third lens group G3 in the direction of an optical axis. Consequently, it is possible to suppress fluctuations of a spherical aberration and curvature of field due to focusing. Further, it is possible to reduce the weight of the focusing lens group, compared with a case of extending the whole system.

Further, it is desirable that the following conditional expression (2) is satisfied. If the value is lower than the lower limit of conditional expression (2), the amount of movement of third lens group G3 due to focusing increases, and reduction in the size of the imaging lens becomes difficult. On the other hand, if the value exceeds the upper limit of conditional expression (2), fluctuations of a spherical aberration and curvature of field due to focusing become large. Here, when the following conditional expression (2a) is satisfied, more excellent characteristics are achievable:

$$0.4 < f/f3 < 0.8 \quad (2); \text{ and}$$

$$0.5 < f/f3 < 0.7 \quad (2a), \text{ where}$$

f3: a focal length of third lens group G3.

Further, it is desirable that the following conditional expression (3) is satisfied. If the value is lower than the lower limit of conditional expression (3), that is disadvantageous to correction of distortion and a lateral chromatic aberration. On the other hand, if the value exceeds the upper limit of conditional expression (3), it becomes difficult to maintain a backfocus. Here, when the following conditional expression (3a) is satisfied, more excellent characteristics are achievable:

$$-0.6 < f/f1 < 0.8 \quad (3); \text{ and}$$

$$-0.5 < f/f1 < 0.6 \quad (3a), \text{ where}$$

f1: a focal length of first lens group G1.

Further, it is desirable that the following conditional expression (4) is satisfied. If the value is lower than the lower limit of conditional expression (4), a longitudinal chromatic aberration is under-corrected. On the other hand, if the value exceeds the upper limit of conditional expression (4), it becomes difficult to balance a longitudinal chromatic aberration and a lateral chromatic aberration. Here, when the following conditional expression (4a) is satisfied, more excellent characteristics are achievable:

$$20 < vd1pave < 45 \quad (4); \text{ and}$$

$$25 < vd1pave < 40 \quad (4a), \text{ where}$$

vd1pave: an Abbe number of a most image-side lens in first lens group G1 when the number of lenses in first lens group G1 arranged toward the image side of L14 lens L14 is two, and an average Abbe number of two lenses from the image side among three lenses arranged toward the image side of L14 lens L14 in first lens group G1 when the number of lenses in first lens group G1 arranged toward the image side of L14 lens L14 is three.

Further, it is desirable that L11 lens L11 and L12 lens L12 are cemented together. When the imaging lens is structured in such a manner, it is possible to suppress fluctuations of distortion and a lateral chromatic aberration due to an error in the distance between L11 lens L11 and L12 lens L12.

In the imaging lens of the present invention, it is desirable to use glass as a specific material arranged most toward the object side. Alternatively, transparent ceramic may be used.

When the imaging lens of the present invention is used in tough environments, it is desirable that a multilayer coating for protection is applied. Further, an anti-reflection coating for reducing ghost light or the like during usage may be applied besides the coating for protection.

FIG. 1 illustrates an example in which optical member PP is arranged between the lens system and image plane Sim. Instead of arranging there various filters, such as a low-pass filter and a filter that cuts a specific wavelength band, the various filters may be arranged between lenses. Alternatively, a coating having a similar action to that of the various filters may be applied to a lens surface of one of the lenses.

Next, numerical value examples of the imaging lens of the present invention will be described. Numerical values in the following tables 1 through 13 and aberration diagrams illustrated in FIGS. 7 through 12 are normalized so that the focal length of the entire system when the lens system is focused on an object at infinity is 1.0.

First, an imaging lens in Example 1 will be described. FIG. 1 is a cross section illustrating the lens structure of the imaging lens in Example 1. Optical member PP is also illustrated in FIG. 1 and FIGS. 2 through 6 corresponding to Examples 2 through 6, which will be described later. Further, the left side is the object side, and the right side is the image side. Illustrated aperture stop St does not necessarily represent the size nor the shape of aperture stop, but a position on optical axis Z.

The imaging lens in Example 1 consists of first lens group G1 having positive refractive power, second lens group G2 having negative refractive power, aperture stop St, and third lens group G3 having positive refractive power in this order from the object side.

First lens group G1 consists of a cemented lens of biconvex L11 lens L11 and biconcave L12 lens L12, L13 meniscus lens L13 having negative refractive power with its concave surface facing the image side, a cemented lens of biconcave L14 lens L14 and biconvex lens L15, plano-convex lens L16 with its convex surface facing the image side, and meniscus lens L17 having positive refractive power with its convex surface facing the object side in this order from the object side.

Second lens group G2 consists of a cemented lens of lens L21 (L2p lens) having positive refractive power and lens L22 (L2n lens) having negative refractive power in this order from the object side. The cemented surface of this cemented lens is convex toward the image side.

Third lens group G3 consists of a cemented lens of lenses L31 and L32, the cemented surface of which is convex toward the object side, meniscus lens L33 having negative refractive power with its concave surface facing the object side, a cemented lens of lenses L34 and L35, the cemented surface of which is convex toward the image side, meniscus lens L36 having positive refractive power with its convex surface facing the image side, and biconvex lens L37 in this order from the object side.

In first lens group G1, when L11 lens L11 has a biconvex shape, that is effective in correcting distortion. When L12 lens L12 has a biconcave shape, it is possible to secure negative refractive power to widen an angle of view. Further, when L11 lens L11 and L12 lens L12 are cemented together, it is possible to suppress fluctuations of distortion and a lateral chromatic aberration due to an error in the distance between L11 lens L11 and L12 lens L12. When a cemented lens of biconcave L14 lens L14 and biconvex lens L15 is arranged toward the image side of L13 lens L13, that is advantageous to balancing a longitudinal chromatic aberration and a lateral chromatic aberration. Next, when two positive lenses L16 and L17 are arranged, that is advantageous to balancing a longitudinal chromatic aberration and a lateral chromatic aberration while suppressing generation of a spherical aberration. When these two positive lenses are plano-convex lens L16 and meniscus lens L17 having positive refractive power with its convex surface facing the object side arranged in this order, that is not only advantageous to suppressing generation of a spherical aberration, but the arrangement in which the two lenses having positive refractive power are arranged so that their convex surfaces face each other is also effective in cancelling out coma aberrations. When high dispersion glass material is used as the material of these two positive lenses, that is more advantageous to balancing the longitudinal chromatic aberration and the lateral chromatic aberration.

When second lens group G2 consists of lens L21 (L2p lens) having positive refractive power and lens L22 (L2n lens) having negative refractive power, that is effective in correcting a coma aberration. L2p lens and lens L2n lens may be arranged in reverse order, and even in such a case, the effect on the coma aberration does not greatly differ.

In third lens group G3, when a cemented lens of lens L31 and lens L32, the cemented surface of which is convex toward the object side, is arranged most toward the object side, that is advantageous to correction of a longitudinal chromatic aberration and a spherical aberration. Next, when meniscus lens L33 having negative refractive power with its concave surface facing the object side is arranged, that is advantageous to suppressing generation of astigmatism while correcting a spherical aberration. Next, when a cemented lens of lens L34 and lens L35, the cemented surface of which is convex toward the image side, is arranged, that is advantageous to suppressing generation of astigmatism while correcting a longitudinal chromatic aberration and a spherical aberration. Next, when meniscus lens L36 having positive refractive power with its convex surface facing the image side is arranged, that is advantageous to correction of astigmatism. Next, when biconvex lens L37 is arranged, that is advantageous to reducing an angle of incidence of peripheral rays entering an imaging device.

Table 1 shows basic lens data of the imaging lens in Example 1, and Table 2 shows data about specification of the imaging lens in Example 1.

Next, the meanings of signs in the tables will be described by using Example 1 as an example. The meanings of signs in Examples 2 through 6 are basically similar to Example 1.

In the lens data of Table 1, a column of Si shows the surface number of i-th surface (i=1, 2, 3 . . . ) that sequentially increases toward the image side when a most object-side surface of composition elements is the first surface. A column of Ri shows the curvature radius of the i-th surface, and a column of Di shows a surface distance on optical axis Z between an i-th surface and an (i+1)th surface. Further, a column of Ndi shows a refractive index for d-line (wavelength is 587.6 nm) of a medium between the i-th surface and the (i+1)th surface. A column of vdj shows an Abbe number of a j-th optical element (j=1, 2, 3 . . . ) with respect to d-line when a most object-side optical element is the first optical element and j sequentially increases toward the image side.

Here, the sign of a curvature radius is positive when a surface shape is convex toward the object side, and negative when a surface shape is convex toward the image side. The basic lens data show also aperture stop St and optical member PP. In the column of surface numbers, the term "(STOP)" is written together with the surface number of a surface corresponding to aperture stop St.

Data about specification in Table 2 show focal length f', backfocus Bf', F-number Fno., and full angle 2ω of view.

In the basic lens data and the data about specification, degrees are used as the unit of angles. However, no unit is present for the other values because the values are normalized.

TABLE 1

EXAMPLE 1•LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 1 | 3.170228 | 0.3735 | 1.88300 | 40.76 |
| 2 | −17.160465 | 0.0980 | 1.49700 | 81.54 |
| 3 | 0.931126 | 0.4842 | | |
| 4 | 2.010100 | 0.0620 | 1.88300 | 40.76 |
| 5 | 0.974087 | 0.3763 | | |
| 6 | −1.064022 | 0.0528 | 1.80809 | 22.76 |
| 7 | 1.745139 | 0.3050 | 1.51633 | 64.14 |
| 8 | −1.745139 | 0.0080 | | |
| 9 | ∞ | 0.2221 | 1.85026 | 32.27 |
| 10 | −1.592579 | 0.0076 | | |
| 11 | 1.901365 | 0.1969 | 1.84666 | 23.88 |
| 12 | 45.633058 | 0.2443 | | |
| 13 | 39.318248 | 0.1763 | 1.75500 | 52.32 |
| 14 | −1.361496 | 0.0480 | 1.51742 | 52.43 |
| 15 | 1.857037 | 0.3951 | | |
| 16(STOP) | ∞ | 0.2546 | | |
| 17 | 14.626601 | 0.0560 | 1.83481 | 42.73 |
| 18 | 1.137681 | 0.2174 | 1.49700 | 81.54 |
| 19 | −1.847704 | 0.0688 | | |
| 20 | −0.869676 | 0.0480 | 1.51742 | 52.43 |
| 21 | −1.435003 | 0.0287 | | |
| 22 | −5.516513 | 0.2774 | 1.49700 | 81.54 |
| 23 | −0.736632 | 0.0512 | 1.84666 | 23.88 |
| 24 | −1.332339 | 0.0080 | | |
| 25 | −5.128717 | 0.3584 | 1.64000 | 60.08 |
| 26 | −1.487628 | 0.0080 | | |
| 27 | 5.773000 | 0.1781 | 1.83481 | 42.73 |
| 28 | −5.773000 | 0.2001 | | |
| 29 | ∞ | 0.0920 | 1.51633 | 64.14 |
| 30 | ∞ | 1.1183 | | |

TABLE 2

EXAMPLE 1•SPECIFICATION (d-LINE)

| | |
|---|---|
| f' | 1.00 |
| Bf' | 1.38 |
| FNo. | 1.90 |
| 2ω [°] | 68.0 |

FIG. 7, Sections A through E are aberration diagrams of the imaging lens in Example 1. FIG. 7, Sections A through E illustrate a spherical aberration, sine condition, astigmatism, distortion and a lateral chromatic aberration, respectively.

The aberration diagrams of a spherical aberration, sine condition, astigmatism and distortion illustrate aberrations when d-line (wavelength is 587.6 nm) is a reference wavelength. The aberration diagram of the spherical aberration illustrates aberrations for d-line (wavelength is 587.6 nm), C-line (wavelength is 656.3 nm), F-line (wavelength is 486.1 nm) and g-line (wavelength is 435.8 nm) by a solid line, a long broken line, a short broken line and a dotted line, respectively. The aberration diagram of the astigmatism illustrates aberrations for a sagittal direction and a tangential direction by a solid line and a broken line, respectively. The aberration diagram of the lateral chromatic aberration illustrates aberrations for C-line (wavelength is 656.3 nm), F-line (wavelength is 486.1 nm) and g-line (wavelength is 435.8 nm) by a long broken line, a short broken line and a dotted line, respectively. In the aberration diagram of the spherical aberration and the aberration diagram of sine condition, Fno. means an F-number. In the other diagrams, ω represents a half angle of view.

Next, an imaging lens in Example 2 will be described. FIG. 2 is a cross section illustrating the lens structure of the imaging lens in Example 2.

The imaging lens in Example 2 consists of first lens group G1 having positive refractive power, second lens group G2 having negative refractive power, aperture stop St, and third lens group G3 having positive refractive power in this order from the object side.

First lens group G1 consists of meniscus L11 lens L11 having positive refractive power with its convex surface facing the object side, L12 meniscus lens L12 having negative refractive power with its concave surface facing the image side, L13 meniscus lens L13 having negative refractive power with its concave surface facing the image side, biconcave L14 lens L14, meniscus lens L15 having positive refractive power with its convex surface facing the image side, and biconvex lens L16 in this order from the object side.

Second lens group G2 consists of a cemented lens of lens L21 (L2p lens) having positive refractive power and lens L22 (L2n lens) having negative refractive power in this order from the object side. The cemented surface of this cemented lens is convex toward the image side.

Third lens group G3 consists of biconvex lens L31, a cemented lens of lens L32 and lens L33, the cemented surface of which is convex toward the object side, meniscus lens L34 having negative refractive power with its concave surface facing the object side, a cemented lens of lens L35 and lens L36, the cemented surface of which is convex toward the image side, meniscus lens L37 having positive refractive power with its convex surface facing the image side, and meniscus lens L38 having negative refractive power with its concave surface facing the object side in this order from the object side.

In first lens group G1, when L11 lens L11 has a meniscus shape with its convex surface facing the object side, it is possible to suppress generation of astigmatism. Further, when L12 lens L12 has a meniscus shape with its concave surface facing the image side, it is possible to reduce generation of distortion. L13 lens L13 is similar to Example 1. Further, when the image-side surface of L14 lens L14 is concave, that is advantageous to correction of a spherical aberration. However, since the absolute value of the curvature radius of the image-side surface of this lens is large, a plano-concave lens with its concave surface facing the object side or a meniscus lens with its concave surface facing the object side, and the curvature radius of a convex surface of which has a large absolute value, can also achieve a similar effect. Next, when two positive lenses are arranged, that is advantageous to balancing a longitudinal chromatic aberration and a lateral chromatic aberration while suppressing generation of a spherical aberration. In Example 2, meniscus lens L15 having positive refractive power with its convex surface facing the image side and biconvex lens L16 are arranged in this order. The absolute value of the curvature radius of the object-side surface of lens L15 and the absolute value of the curvature radius of the image-side surface of lens L16 are large, and convex surfaces having strong refractive power are arranged to face each other. Therefore, the structure is effective in cancelling out coma aberrations in a similar manner to Example 1. Further, when high dispersion glass material is used as the material of positive lens L16, which is arranged most toward the image side, that is more advantageous to balancing the longitudinal chromatic aberration and the lateral chromatic aberration.

The structure and the effect of second lens group G2 are similar to those of Example 1.

In third lens group G3, when biconvex lens L31 is arranged most toward the object side, it is possible to make the positive refractive power of third lens group G3 shared by biconvex lens L31. That is effective in reducing a spherical aberration. Since the refractive power of this lens is weak, it is not necessary that the lens is a biconvex lens. The lens may be a plano-convex lens facing either direction, or a positive meniscus lens. Next, when a cemented lens of lens L32 and lens L33, the cemented surface of which is convex toward the object side, is arranged, that is advantageous to correction of a longitudinal chromatic aberration and a spherical aberration. Next, when meniscus lens L34 having negative refractive power with its concave surface facing the object side is arranged, that is advantageous to suppressing generation of astigmatism while correcting a spherical aberration. Next, when a cemented lens of lens L35 and lens L36, the cemented surface of which is convex toward the image side, is arranged, that is advantageous to suppressing generation of astigmatism while correcting a longitudinal chromatic aberration and a spherical aberration. Next, when meniscus lens L37 having positive refractive power with its convex surface facing the image side is arranged, that is advantageous to correction of astigmatism. Since the absolute value of the curvature radius of the concave surface side of this lens is large, a plano-convex lens with its convex surface facing the image side can also achieve a similar effect. Next, when meniscus lens L38 having negative refractive power with its concave surface facing the object side is arranged, that is effective in balancing correction of curvature of field and a spherical aberration.

Table 3 shows basic lens data of the imaging lens in Example 2, and Table 4 shows data about specification of the imaging lens in Example 2. FIG. 8, Sections A through E are aberration diagrams of the imaging lens in Example 2.

TABLE 3

EXAMPLE 2·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) |
|---|---|---|---|---|
| 1 | 3.693126 | 0.2534 | 1.71299 | 53.87 |
| 2 | 19.942578 | 0.0080 | | |
| 3 | 2.360785 | 0.0881 | 1.61800 | 63.33 |
| 4 | 0.851096 | 0.4962 | | |
| 5 | 2.278080 | 0.0640 | 1.59522 | 67.74 |
| 6 | 1.059824 | 0.3739 | | |
| 7 | −0.971602 | 0.0580 | 1.80809 | 22.76 |
| 8 | 7.419291 | 0.1345 | | |
| 9 | −87.481333 | 0.2841 | 1.88300 | 40.76 |
| 10 | −1.266124 | 0.0080 | | |
| 11 | 2.255727 | 0.2103 | 1.84661 | 23.78 |
| 12 | −16.553950 | 0.3833 | | |
| 13 | 1.898081 | 0.2886 | 1.56908 | 71.30 |
| 14 | −1.033001 | 0.0480 | 1.53172 | 48.84 |

TABLE 3-continued

EXAMPLE 2·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 15 | 1.224501 | 0.2491 | | |
| 16(STOP) | ∞ | 0.2635 | | |
| 17 | 17.615806 | 0.1133 | 1.84661 | 23.78 |
| 18 | −5.172735 | 0.0517 | | |
| 19 | −6.735540 | 0.0560 | 1.88300 | 40.76 |
| 20 | 0.995333 | 0.2650 | 1.60300 | 65.44 |
| 21 | −1.620938 | 0.0812 | | |
| 22 | −0.843662 | 0.0480 | 1.80000 | 29.84 |
| 23 | −1.181843 | 0.0080 | | |
| 24 | −332.532646 | 0.3624 | 1.49700 | 81.54 |
| 25 | −0.785537 | 0.0721 | 1.84661 | 23.78 |
| 26 | −1.214192 | 0.0080 | | |
| 27 | 2147.483648 | 0.2521 | 1.88300 | 40.76 |
| 28 | −1.620612 | 0.0080 | | |
| 29 | −2.226231 | 0.0600 | 1.62004 | 36.26 |
| 30 | −4.752005 | 0.2001 | | |
| 31 | ∞ | 0.0921 | 1.51633 | 64.14 |
| 32 | ∞ | 1.1201 | | |

TABLE 4

EXAMPLE 2·SPECIFICATION (d-LINE)

| | |
|---|---|
| f | 1.00 |
| Bf | 1.38 |
| FNo. | 1.90 |
| 2ω [°] | 67.2 |

Next, an imaging lens in Example 3 will be described. FIG. 3 is a cross section illustrating the lens structure of the imaging lens in Example 3.

The imaging lens in Example 3 consists of first lens group G1 having negative refractive power, second lens group G2 having positive refractive power, aperture stop St, and third lens group G3 having positive refractive power in this order from the object side.

First lens group G1 consists of L11 meniscus lens L11 having positive refractive power with its convex surface facing the object side, L12 meniscus lens L12 having negative refractive power with its concave surface facing the image side, L13 meniscus lens L13 having negative refractive power with its concave surface facing the image side, biconcave L14 lens L14, biconvex lens L15 and meniscus lens L16 having positive refractive power with its convex surface facing the object side in this order from the object side.

Second lens group G2 consists of biconvex lens L21 (L2p lens) and meniscus lens L22 (L2n lens) having negative refractive power with its concave surface facing the image side in this order from the object side.

Third lens group G3 consists of meniscus lens L31 having positive refractive power with its convex surface facing the object side, a cemented lens of lens L32 and lens L33, the cemented surface of which is convex toward the object side, a biconcave lens L34, a cemented lens of lens L35 and lens L36, the cemented surface of which is convex toward the image side, and biconvex lens L37 in this order from the object side.

In first lens group G1, when L11 lens L11 has a meniscus shape with its convex surface facing the object side, it is possible to suppress generation of astigmatism. Further, when L12 lens L12 has a meniscus shape with its concave surface facing the image side, it is possible to reduce generation of distortion. L13 lens L13 is similar to Example 1. Further, when the image-side surface of L14 lens L14 is concave, that is advantageous to correction of a spherical aberration. However, since the absolute value of the curvature radius of the image-side surface of this lens is large, a plano-concave lens with its concave surface facing the object side or a meniscus lens with its concave surface facing the object side, and the curvature radius of a convex surface of which has a large absolute value, can also achieve a similar effect. Next, when two positive lenses are arranged, that is advantageous to balancing a longitudinal chromatic aberration and a lateral chromatic aberration while suppressing generation of a spherical aberration. In Example 3, biconvex lens L15 and meniscus lens L16 having positive refractive power with its convex surface facing the object side are arranged. Since convex surfaces having strong refractive power are arranged to face each other, the structure is effective in cancelling out coma aberrations in a similar manner to Example 1. Further, when high dispersion glass material is used as the material of positive lens L16, which is arranged most toward the image side, that is more advantageous to balancing the longitudinal chromatic aberration and the lateral chromatic aberration.

When second lens group G2 consists of biconvex lens L21 (L2p lens) and meniscus lens L22 (L2n lens) having negative refractive power with its concave surface facing the image side, that is effective in correcting a coma aberration and in reducing a difference in spherical aberrations according to wavelengths.

In third lens group G3, meniscus lens L31 having positive refractive power is arranged most toward the object side. Therefore, it is possible to make the positive refractive power of third lens group G3 shared by lens L31, and that is effective in reducing a spherical aberration. Next, when a cemented lens of lens L32 and lens L33, the cemented surface of which is convex toward the object side, is arranged, that is advantageous to correction of a longitudinal chromatic aberration and a spherical aberration. Next, when biconcave lens L34 is arranged, that is advantageous to correction of a spherical aberration and curvature of field. Next, when a cemented lens of lens L35 and lens L36, the cemented surface of which is convex toward the image side, is arranged, that is advantageous to suppressing generation of astigmatism while correcting a longitudinal chromatic aberration and a spherical aberration. Next, when biconvex lens L37 is arranged, that is advantageous to reducing an angle of incidence of peripheral rays entering an imaging device.

Table 5 shows basic lens data of the imaging lens in Example 3, and Table 6 shows data about specification of the imaging lens in Example 3. FIG. 9, Sections A through E are aberration diagrams of the imaging lens in Example 3.

TABLE 5

EXAMPLE 3·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 1 | 2.855840 | 0.3174 | 1.69680 | 55.53 |
| 2 | 57.348013 | 0.0080 | | |
| 3 | 3.670022 | 0.0880 | 1.61800 | 63.33 |
| 4 | 0.933027 | 0.3779 | | |
| 5 | 1.629257 | 0.0640 | 1.61800 | 63.33 |

TABLE 5-continued

EXAMPLE 3•LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 6 | 0.960176 | 0.2858 | | |
| 7 | −1.223011 | 0.0680 | 1.72047 | 34.71 |
| 8 | 1.887217 | 0.1658 | | |
| 9 | 14.813114 | 0.2105 | 1.88300 | 40.76 |
| 10 | −1.704882 | 0.0078 | | |
| 11 | 3.755185 | 0.3398 | 1.84661 | 23.78 |
| 12 | 38.186375 | 0.5177 | | |
| 13 | 4.194478 | 0.2060 | 1.49700 | 81.54 |
| 14 | −2.014008 | 0.0110 | | |
| 15 | 17.196508 | 0.0600 | 1.51823 | 58.90 |
| 16 | 2.203429 | 0.1079 | | |
| 17(STOP) | ∞ | 0.2608 | | |
| 18 | 3.488653 | 0.1253 | 1.84661 | 23.78 |
| 19 | 17.896435 | 0.1443 | | |
| 20 | 1.152695 | 0.0560 | 1.84661 | 23.78 |
| 21 | 0.730268 | 0.3205 | 1.60300 | 65.44 |
| 22 | −2.260322 | 0.0139 | | |
| 23 | −5.050840 | 0.0480 | 1.59551 | 39.24 |
| 24 | 0.910880 | 0.1459 | | |
| 25 | −8.364598 | 0.3002 | 1.49700 | 81.54 |
| 26 | −0.654389 | 0.0719 | 1.88300 | 40.76 |
| 27 | −2.041989 | 0.0080 | | |
| 28 | 4.232574 | 0.2617 | 1.88300 | 40.76 |
| 29 | −1.809584 | 0.1999 | | |
| 30 | ∞ | 0.0919 | 1.51633 | 64.14 |
| 31 | ∞ | 1.1196 | | |

TABLE 6

EXAMPLE 3•SPECIFICATION (d-LINE)

| | |
|---|---|
| f′ | 1.00 |
| Bf′ | 1.38 |
| FNo. | 1.90 |
| 2ω [°] | 67.4 |

Next, an imaging lens in Example 4 will be described. FIG. 4 is a cross section illustrating the lens structure of the imaging lens in Example 4.

The imaging lens in Example 4 consists of first lens group G1 having positive refractive power, second lens group G2 having negative refractive power, aperture stop St, and third lens group G3 having positive refractive power in this order from the object side.

First lens group G1 consists of a cemented lens of biconvex L11 lens L11 and biconcave L12 lens L12, L13 meniscus lens L13 having negative refractive power with its concave surface facing the image side, a cemented lens of biconcave L14 lens L14 and biconvex lens L15, meniscus lens L16 having positive refractive power with its convex surface facing the image side and biconvex lens L17 in this order from the object side.

Second lens group G2 consists of a cemented lens of lens L21 (L2n lens) having negative refractive power and lens L22 (L2p lens) having positive refractive power in this order from the object side. The concave side of the cemented surface of this cemented lens faces the image side.

Third lens group G3 consists of a cemented lens of lens L31 and lens L32, the cemented surface of which is convex toward the object side, meniscus lens L33 having negative refractive power with its concave surface facing the object side, a cemented lens of lens L34 and lens L35, the cemented surface of which is convex toward the image side, meniscus lens L36 having positive refractive power with its convex surface facing the image side and biconvex lens L37 in this order from the object side.

In first lens group G1, the shapes of two lenses closest to the image side differ from those of Example 1. However, the effect of first lens group G1 is almost similar to that of Example 1.

Second lens group G2 consists of lens L21 (L2n lens) having negative refractive power and lens L22 (L2p lens) having positive refractive power in this order from the object side. The order of arrangement is opposite to the order of arrangement in Example 1. As described already in Example 1, the effect on the coma aberration does not greatly differ even if they are arranged in the reverse order. Regarding correction of a spherical aberration, this order is advantageous.

The structure and the effect of third lens group G3 are similar to those of Example 1.

Figure 10:
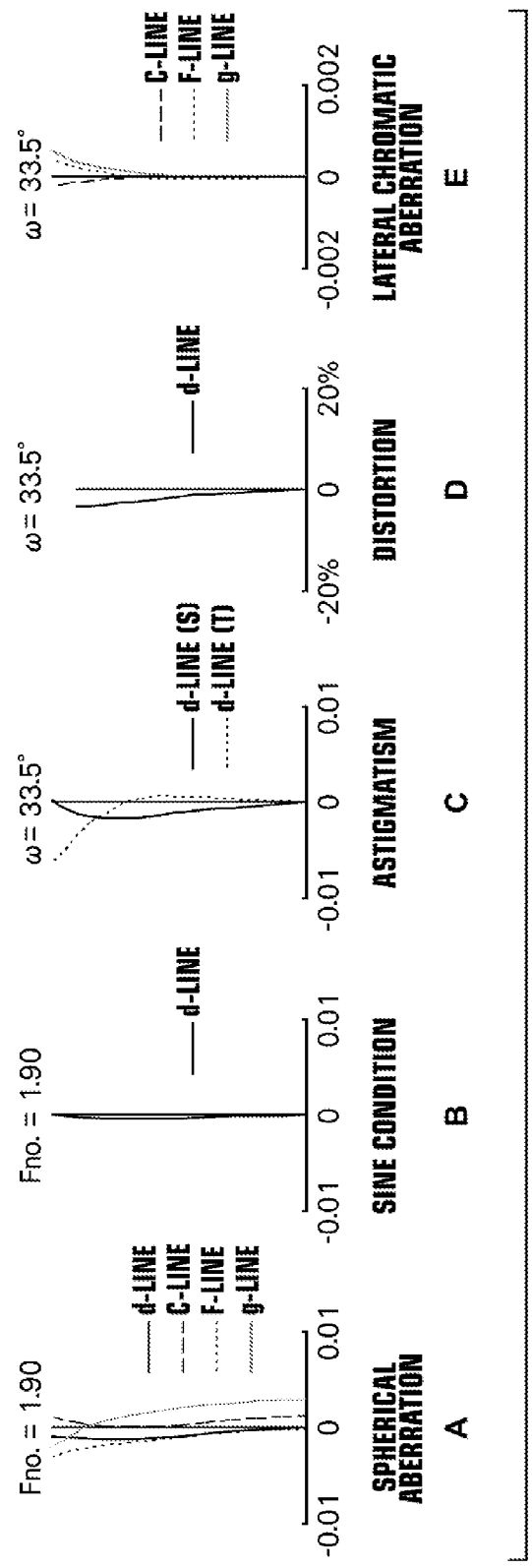
FIG. 10 is aberration diagrams (Sections A through E) of the imaging lens in Example 4 of the present invention.

Table 7 shows basic lens data of the imaging lens in Example 4, and Table 8 shows data about specification of the imaging lens in Example 4. FIG. 10, Sections A through E are aberration diagrams of the imaging lens in Example 4.

TABLE 7

EXAMPLE 4•LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 1 | 3.251613 | 0.3417 | 1.88300 | 40.76 |
| 2 | −13.163850 | 0.0984 | 1.49700 | 81.54 |
| 3 | 0.833197 | 0.4858 | | |
| 4 | 2.287082 | 0.0622 | 1.88300 | 40.76 |
| 5 | 1.108452 | 0.3389 | | |
| 6 | −0.958608 | 0.0530 | 1.80809 | 22.76 |
| 7 | 1.392784 | 0.3359 | 1.71299 | 53.87 |
| 8 | −1.982001 | 0.0572 | | |
| 9 | −3.354714 | 0.1648 | 1.85026 | 32.27 |
| 10 | −1.534351 | 0.0076 | | |
| 11 | 2.058689 | 0.2368 | 1.84666 | 23.88 |
| 12 | −4.787336 | 0.5037 | | |
| 13 | −1.954583 | 0.0486 | 1.80400 | 46.58 |
| 14 | 13.888474 | 0.1726 | 1.58913 | 61.14 |
| 15 | −1.480484 | 0.2234 | | |
| 16(STOP) | ∞ | 0.3101 | | |
| 17 | 3.579404 | 0.0562 | 1.88300 | 40.76 |
| 18 | 0.968996 | 0.2218 | 1.49700 | 81.54 |
| 19 | −2.681773 | 0.0815 | | |
| 20 | −0.867107 | 0.0482 | 1.59551 | 39.24 |
| 21 | −2.905403 | 0.0280 | | |
| 22 | −3.347950 | 0.2924 | 1.49700 | 81.54 |
| 23 | −0.701811 | 0.0514 | 1.84666 | 23.88 |
| 24 | −1.158778 | 0.0080 | | |
| 25 | −7.066487 | 0.2092 | 1.78800 | 47.37 |
| 26 | −1.540520 | 0.0080 | | |
| 27 | 6.018227 | 0.1662 | 1.83481 | 42.71 |
| 28 | −6.018227 | 0.2007 | | |
| 29 | ∞ | 0.0923 | 1.51633 | 64.14 |
| 30 | ∞ | 1.1239 | | |

TABLE 8

EXAMPLE 4•SPECIFICATION (d-LINE)

| | |
|---|---|
| f′ | 1.00 |
| Bf′ | 1.39 |
| FNo. | 1.90 |
| 2ω [°] | 67.0 |

Next, an imaging lens in Example 5 will be described. FIG. 5 is a cross section illustrating the lens structure of the imaging lens in Example 5.

The imaging lens in Example 5 consists of first lens group G1 having positive refractive power, second lens group G2 having negative refractive power, aperture stop St, and third lens group G3 having positive refractive power in this order from the object side.

First lens group G1 consists of a cemented lens of biconvex L11 lens L11 and biconcave L12 lens L12, L13 meniscus lens L13 having negative refractive power with its concave surface facing the image side, a cemented lens of biconcave L14 lens L14 and biconvex lens L15, biconvex lens L16 and biconvex lens L17 in this order from the object side.

Second lens group G2 consists of a cemented lens of lens L21 (L2p lens) having positive refractive power and lens L22 (L2n lens) having negative refractive power in this order from the object side. The cemented surface of this cemented lens is convex toward the image side.

Third lens group G3 consists of a cemented lens of lens L31 and lens L32, the cemented surface of which is convex toward the object side, meniscus lens L33 having negative refractive power with its concave surface facing the object side, a cemented lens of lens L34 and lens L35, the cemented surface of which is convex toward the image side, meniscus lens L36 having positive refractive power with its convex surface facing the image side and biconvex lens L37 in this order from the object side.

In first lens group G1, both of two lenses L16 and L17 closest to the image side are biconvex lenses. Since the absolute value of the curvature radius of the object-side surface of lens L16 and the absolute value of the curvature radius of the image-side surface of lens L17 are large, an effect similar to Example 1 is achievable.

The structure and the effect of second lens group G2 and third lens group G3 are similar to those of Example 1.

Figure 11:
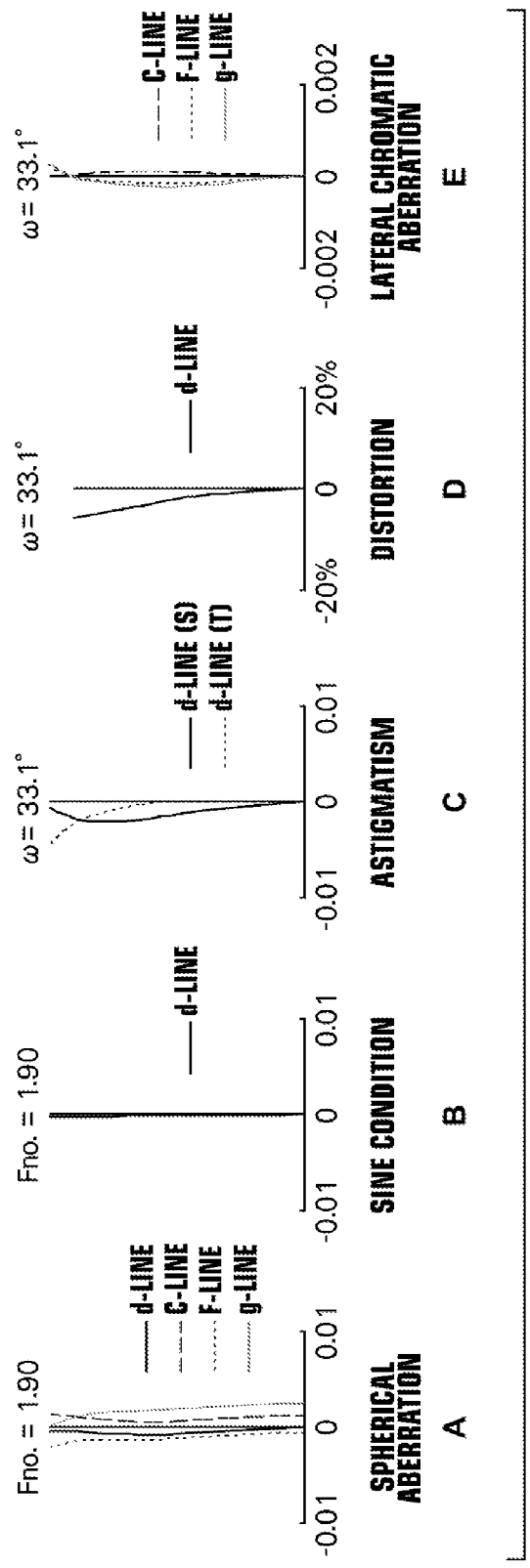
FIG. 11 is aberration diagrams (Sections A through E) of the imaging lens in Example 5 of the present invention.

Table 9 shows basic lens data of the imaging lens in Example 5, and Table 10 shows data about specification of the imaging lens in Example 5. FIG. 11, Sections A through E are aberration diagrams of the imaging lens in Example 5.

TABLE 9

EXAMPLE 5·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 1 | 3.087415 | 0.3822 | 1.78590 | 44.20 |
| 2 | −13.798931 | 0.0982 | 1.49700 | 81.54 |
| 3 | 0.895368 | 0.4849 | | |
| 4 | 2.305932 | 0.0621 | 1.61800 | 63.33 |
| 5 | 1.080545 | 0.3417 | | |
| 6 | −1.220676 | 0.0529 | 1.80809 | 22.76 |
| 7 | 2.121321 | 0.2475 | 1.43875 | 94.93 |
| 8 | −5.492339 | 0.0576 | | |
| 9 | 31.366299 | 0.2415 | 1.83400 | 37.16 |
| 10 | −1.623877 | 0.0076 | | |
| 11 | 2.332739 | 0.1894 | 1.84139 | 24.56 |
| 12 | −14.947386 | 0.4702 | | |
| 13 | 1.477198 | 0.2396 | 1.61800 | 63.33 |
| 14 | −1.358832 | 0.0481 | 1.51742 | 52.43 |
| 15 | 0.938717 | 0.2278 | | |
| 16(STOP) | ∞ | 0.2585 | | |
| 17 | −8.497068 | 0.0561 | 1.83481 | 42.73 |
| 18 | 1.110325 | 0.2213 | 1.61800 | 63.33 |
| 19 | −1.660461 | 0.0770 | | |
| 20 | −0.757333 | 0.0481 | 1.58267 | 46.42 |
| 21 | −1.429189 | 0.0262 | | |
| 22 | −20.557595 | 0.3195 | 1.49700 | 81.54 |
| 23 | −0.768560 | 0.0513 | 1.84666 | 23.78 |
| 24 | −1.294897 | 0.0080 | | |
| 25 | −3.439448 | 0.2103 | 1.64000 | 60.08 |
| 26 | −1.282361 | 0.0080 | | |
| 27 | 6.069758 | 0.1656 | 1.83400 | 37.16 |
| 28 | −6.069758 | 0.2004 | | |
| 29 | ∞ | 0.0922 | 1.51633 | 64.14 |
| 30 | ∞ | 1.1234 | | |

TABLE 10

EXAMPLE 5·SPECIFICATION (d-LINE)

| | |
|---|---|
| f' | 1.00 |
| Bf' | 1.38 |
| FNo. | 1.90 |
| 2ω [°] | 68.2 |

Next, an imaging lens in Example 6 will be described. FIG. 6 is a cross section illustrating the lens structure of the imaging lens in Example 6.

The imaging lens in Example 6 consists of first lens group G1 having positive refractive power, second lens group G2 having negative refractive power, aperture stop St, and third lens group G3 having positive refractive power in this order from the object side.

First lens group G1 consists of biconvex L11 lens L11, L12 meniscus lens L12 having negative refractive power with its concave surface facing the image side, L13 meniscus lens L13 having negative refractive power with its concave surface facing the image side, a cemented lens of biconcave L14 lens L14 and biconvex lens L15, a meniscus lens L16 having positive refractive power with its convex surface facing the image side, and biconvex lens L17 in this order from the object side.

Second lens group G2 consists of a cemented lens of lens L21 (L2p lens) having positive refractive power and lens L22 (L2n lens) having negative refractive power in this order from the object side. The cemented surface of this cemented lens is convex toward the image side.

Third lens group G3 consists of a cemented lens of lens L31 and lens L32, the cemented surface of which is convex toward the object side, meniscus lens L33 having negative refractive power with its concave surface facing the object side, a cemented lens of lens L34 and lens L35, the cemented surface of which is convex toward the image side, biconvex lens L36 and biconvex lens L37 in this order from the object side.

In first lens group G1, two lenses closest to the image side are meniscus lens L16 having positive refractive power with its convex surface facing the image side and biconvex lens L17. Since the absolute value of the curvature radius of the object-side surface of lens L16 and the absolute value of the curvature radius of the image-side surface of lens L17 are large, an effect similar to Example 1 is achievable.

The structure and the effect of second lens group G2 are similar to those of Example 1.

In third lens group G3, lens L36, which is the second lens from the image side, is a biconvex lens, compared with Example 1. This structure is effective in reducing a spherical aberration.

Figure 12:
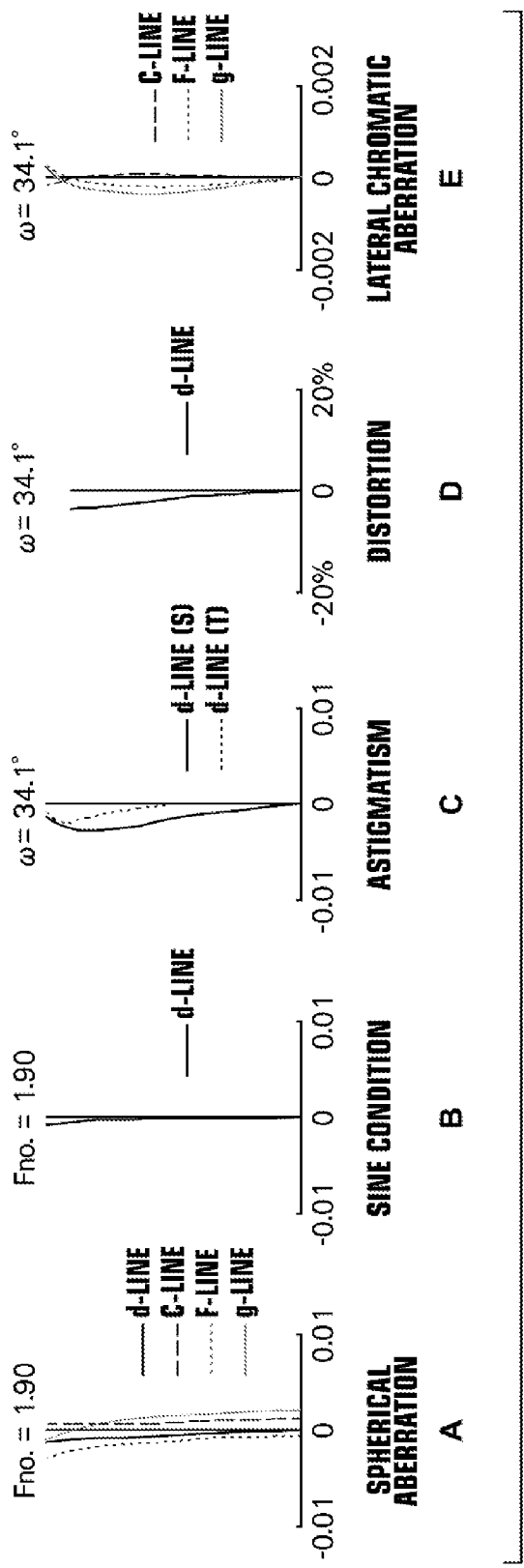
FIG. 12 is aberration diagrams (Sections A through E) of the imaging lens in Example 6 of the present invention.

Table 11 shows basic lens data of the imaging lens in Example 6, and Table 12 shows data about specification of the imaging lens in Example 6. FIG. 12, Sections A through E are aberration diagrams of the imaging lens in Example 6.

TABLE 11

EXAMPLE 6•LENS DATA

| Si (SURFACE NUMBER) | Ri (CURVATURE RADIUS) | Di (SURFACE DISTANCE) | Ndi (REFRACTIVE INDEX) | vdj (ABBE NUMBER) |
|---|---|---|---|---|
| 1 | 7.811503 | 0.1926 | 1.78590 | 44.20 |
| 2 | −44.122145 | 0.0080 | | |
| 3 | 2.521631 | 0.0982 | 1.49700 | 81.54 |
| 4 | 0.887334 | 0.4852 | | |
| 5 | 2.482931 | 0.0622 | 1.69680 | 55.53 |
| 6 | 1.116216 | 0.3590 | | |
| 7 | −1.017341 | 0.0529 | 1.80809 | 22.76 |
| 8 | 3.498217 | 0.1706 | 1.43875 | 94.93 |
| 9 | −5.641608 | 0.0885 | | |
| 10 | −8.819018 | 0.2327 | 1.83400 | 37.16 |
| 11 | −1.418622 | 0.0076 | | |
| 12 | 3.395143 | 0.2018 | 1.84139 | 24.56 |
| 13 | −4.731431 | 0.6353 | | |
| 14 | 1.371010 | 0.2881 | 1.69680 | 55.53 |
| 15 | −1.943081 | 0.0481 | 1.53172 | 48.84 |
| 16 | 0.997555 | 0.2113 | | |
| 17(STOP) | ∞ | 0.2680 | | |
| 18 | 6.459110 | 0.0561 | 1.83481 | 42.73 |
| 19 | 0.952846 | 0.2645 | 1.49700 | 81.54 |
| 20 | −1.261655 | 0.0622 | | |
| 21 | −0.760596 | 0.0481 | 1.56732 | 42.82 |
| 22 | −9.799699 | 0.0080 | | |
| 23 | 4.651409 | 0.3972 | 1.43875 | 94.93 |
| 24 | −0.691673 | 0.0513 | 1.84666 | 23.78 |
| 25 | −0.867648 | 0.0080 | | |
| 26 | 7.996745 | 0.1742 | 1.71299 | 53.87 |
| 27 | −3.649802 | 0.0080 | | |
| 28 | 11.552676 | 0.1218 | 1.83400 | 37.16 |
| 29 | −11.552676 | 0.2005 | | |
| 30 | ∞ | 0.0922 | 1.51633 | 64.14 |
| 31 | ∞ | 1.1200 | | |

TABLE 12

EXAMPLE 6•SPECIFICATION (d-LINE)

| | |
|---|---|
| f' | 1.00 |
| Bf' | 1.38 |
| FNo. | 1.90 |
| 2ω [°] | 68.2 |

Table 13 shows values corresponding to conditional expressions (1) through (4) about the imaging lenses in Examples 1 through 6. Here, d-line is a reference wavelength in all of the examples. The following table 13 shows values at this reference wavelength.

TABLE 13

| EXPRESSION NUMBER | CONDITIONAL EXPRESSION | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | vd12 − vd14 | 58.78 | 40.57 | 28.62 | 58.78 | 58.78 | 58.78 |
| (2) | f/f3 | 0.61 | 0.61 | 0.54 | 0.54 | 0.64 | 0.56 |
| (3) | f/f1 | 0.44 | 0.27 | −0.35 | 0.50 | 0.27 | 0.15 |
| (4) | vd1 pave | 28.08 | 23.78 | 23.78 | 28.08 | 30.86 | 30.86 |

As the above data show, all of the imaging lenses in Examples 1 through 6 satisfy conditional expressions (1) through (4). It is recognizable that various aberrations are excellently corrected in the imaging lenses while F-numbers are about 1.9, which means fast lenses, and the total lengths are short.

Figure 13:
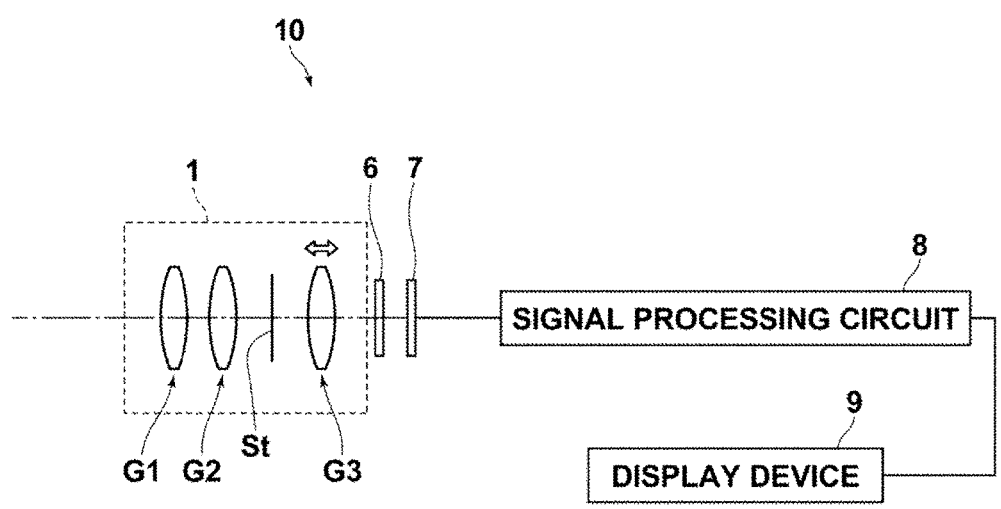
FIG. 13 is a schematic diagram illustrating the configuration of an imaging apparatus according to an embodiment of the present invention.

Next, an imaging apparatus according to an embodiment of the present invention will be described. FIG. 13 is a schematic diagram illustrating the configuration of an imaging apparatus using an imaging lens according to an embodiment of the present invention, as an example of an imaging apparatus according to an embodiment of the present invention. In FIG. 13, each lens group is schematically illustrated. This imaging apparatus is, for example, a video camera, an electronic still camera or the like using a solid-state imaging device, such as a CCD and 15. a CMOS, as a recording medium.

An imaging apparatus 10, such as a video camera, illustrated in FIG. 13 includes an imaging lens 1, a filter 6, an imaging device 7 and a signal processing circuit 8. The filter 6 is arranged toward the image side of the imaging lens 1, and has a function as a low-pass filter or the like, and the imaging device 7 is arranged toward the image side of the filter 6. The imaging device 7 converts an optical image formed by the imaging lens 1 into electrical signals. For example, a CCD (Charge Coupled Device), a CMOS (Complementary Metal Oxide Semiconductor) and the like may be used as the imaging device 7. The imaging device 7 is arranged in such a manner that an imaging surface of the imaging device 7 and the image plane of the imaging lens 1 match with each other.

An image imaged by the imaging lens 1 is formed on an imaging surface of the imaging device 7. Signals about the image are output from the imaging device 7, and operation processing is performed on the output signals at the signal processing circuit 8. Further, an image is displayed on a display device 9.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens element are not limited to the values in the numerical value examples, but may be other values.

What is claimed is:

1. An imaging lens consisting of:
   a first lens group;
   a second lens group;
   a stop; and
   a third lens group that has positive refractive power in this order from an object side,
   wherein the first lens group consists of a first lens (L11) having positive refractive power, a second lens (L12) having negative refractive power, a third, meniscus lens (L13) having negative refractive power with its concave surface facing an image side, a fourth lens (L14) having negative refractive power, and two or three further lenses (L15, L16, L17), each having positive refractive power, in this order from the object side, the concave surface of the fourth lens (L14) facing the object side and facing the two or three further lenses, and wherein the second lens group consists of two lenses of an L2p lens having positive refractive power and an L2n lens having negative refractive power, and wherein the third lens group includes a cemented lens of a lens having positive refractive power and a lens having negative refractive power cemented together, a lens having negative refractive power, and a cemented lens of a lens having positive refractive power and a lens having negative refractive power cemented together consecutively in this order from the object side.

2. The imaging lens, as defined in claim 1, wherein the following conditional expression is satisfied:

$$20 < vd12 - vd14 \qquad (1), \text{where}$$

vd12: an Abbe number of the second lens (L12) with respect to d-line, and vd14: an Abbe number of the fourth lens (L14) with respect to d-line.

3. The imaging lens, as defined in claim 1, wherein the third lens group includes at least three lenses, each having positive refractive power, and at least three lenses, each having negative refractive power.

4. The imaging lens, as defined in claim 1, wherein focusing is performed by moving the third lens group in the direction of an optical axis.

5. The imaging lens, as defined in claim 4, wherein the following conditional expression is satisfied:

$$0.4 < f/f3 < 0.8 \qquad (2), \text{where}$$

f: the focal length of the entire system,
f3: a focal length of the third lens group.

6. The imaging lens, as defined in claim 1, wherein the following conditional expression is satisfied:

$$-0.6 < f/f1 < 0.8 \qquad (3), \text{where}$$

f: the focal length of the entire system,
f1: a focal length of the first lens group.

7. The imaging lens, as defined in claim 1, wherein the following conditional expression is satisfied:

$$20 < vd1pave < 45 \qquad (4), \text{where}$$

vd1pave: an Abbe number of a lens most toward the image side in the first lens group when the number of lenses in the first lens group arranged toward the image side of the fourth lens (L14) is two, and an average Abbe number of two lenses from the image side among three lenses arranged toward the image side of the fourth lens (L14) in the first lens group when the number of lenses in the first lens group arranged toward the image side of the fourth lens (L14) is three.

8. The imaging lens, as defined in claim 1, wherein the first lens (L11) and the second lens (L12) are cemented together.

9. The imaging lens, as defined in claim 2, wherein the following conditional expression is satisfied:

$$25 < vd12 - vd14 \qquad (1a).$$

10. The imaging lens, as defined in claim 5, wherein the following conditional expression is satisfied:

$$0.5 < f/f3 < 0.7 \qquad (2a).$$

11. The imaging lens, as defined in claim 6, wherein the following conditional expression is satisfied:

$$-0.5 < f/f1 < 0.6 \qquad (3a).$$

12. The imaging lens, as defined in claim 7, wherein the following conditional expression is satisfied:

$$25 < vd1pave < 40 \qquad (4a).$$

13. An imaging apparatus comprising:
the imaging lens, as defined in claim 1.

* * * * *